United States Patent [19]
Workman et al.

[11] Patent Number: 5,996,814
[45] Date of Patent: Dec. 7, 1999

[54] BICYCLE WORKSTAND

[75] Inventors: Jonathan P. Workman, Masonville; Kenneth W. House, Fort Collins, both of Colo.

[73] Assignee: Ultimate Support Systems, Inc., Fort Collins, Colo.

[21] Appl. No.: 08/886,689

[22] Filed: Jul. 1, 1997

[51] Int. Cl.⁶ .................................................. A47F 7/00
[52] U.S. Cl. ............................................................. 211/22
[58] Field of Search ................................. 211/17, 22, 18, 211/19, 20, 21, 23, 24, 5

[56] References Cited

U.S. PATENT DOCUMENTS

| | | | |
|---|---|---|---|
| D. 229,132 | 11/1973 | Uroshevich | D6/29 |
| D. 289,835 | 5/1987 | Schoenig et al. | D6/462 |
| D. 330,695 | 11/1992 | Simmons | D12/115 |
| D. 335,889 | 5/1993 | Gibran | D16/244 |
| D. 356,901 | 4/1995 | Schoenig et al. | D6/400 |
| 577,910 | 3/1897 | Bierbach . | |
| 592,534 | 10/1897 | Webster et al. . | |
| 594,627 | 11/1897 | Hewlett . | |
| 605,429 | 6/1898 | Howard . | |
| 619,186 | 2/1899 | Kingsbury . | |
| 653,519 | 7/1900 | Masters . | |
| 3,675,784 | 7/1972 | John | 211/22 |
| 3,981,491 | 9/1976 | Snyder | 269/64 |
| 4,629,150 | 12/1986 | O'Callaghan | 248/167 |
| 4,988,064 | 1/1991 | Hoshino | 248/17 |
| 5,165,635 | 11/1992 | Hoshino | 248/169 |
| 5,320,227 | 6/1994 | Minoura | 211/22 |
| 5,322,250 | 6/1994 | Wilhite, Jr. | 248/166 |
| 5,497,967 | 3/1996 | Gantois | 248/166 |
| 5,509,629 | 4/1996 | Sassmannshausen et al. | 248/171 |

OTHER PUBLICATIONS

1997 Park Tool Catalog, pp. 58 and 59.

*Primary Examiner*—Alvin Chin-Shue
*Assistant Examiner*—Sarah Purol
*Attorney, Agent, or Firm*—Luke Santangelo; Santangelo Law Offices, P.C.

[57] ABSTRACT

A device and method of supporting a bicycle load in a workstand, wherein the workstand can be supported on only two members which establish three individual points of support. The workstand can utilize at least one rotatable leg to collapse the workstand into a portable and manageable configuration that facilitates transporting and storage. The load support member to which the bicycle is either directly or indirectly coupled can be coupled to the support base off-center from the geometric center of the support base to provide a more stable configuration for the stand as well as to establish the member out of the way of the bicycle which must be supported. In addition, a space saving footprint established by the support base allows the workstand to be positioned against walls and in corners.

96 Claims, 11 Drawing Sheets

BICYCLE WORKSTAND

BACKGROUND

The present invention relates generally to the field of supporting loads such as bicycles and speakers with a support stand. In the support system field one is faced with two conflicting objectives, the first being to provide a sturdy support that will yield the type of support that is required for a heavy load. The second and competing objective is to also provide a support that is capable of easy storage as well as portability. In the past, others have focused on either the portable feature or the substantial structure feature with limited success in combining the two. Furthermore, it is always a goal to provide a support that is easy to manufacture as well as being cost efficient. Often, in many past systems, designers have taken the approach that a symmetrical configuration is the most efficient configuration to provide for a given load. This is often due to the fact that the load is positioned directly on top of the support so that the support structure provides support immediately below the load. However, this approach fails to take into consideration loads which are unbalanced or that are not positioned immediately above the support structure. Rather some loads can be positioned by a clamping arm on the support structure. As a result, these loads that are not either positioned immediately above a symmetrical support or that are positioned by way of a clamping arm often result in the entire support and load assembly being off balance and unstable. As a result these prior designs have left the support in a less desirable configuration than a user of the support would desire.

Furthermore in regard to some types of specific loads such as bicycles or speakers, the prior symmetrical support configurations are particularly undesirable. In the bicycle field it is often necessary to configure the support structure in an area that is cramped for space, such as a garage, a service area in a repair shop, or a display area in a retail store. As one can readily understand such space in a garage, workshop, store, or even an individual's home comes at a premium. Therefore, it is important in utilizing such supports to work on a bicycle to have a support that lends itself towards installation in either a corner or up against a wall.

In regard to speaker assemblies, again it is often a tight space in which such speakers need to be erected. Consequently prior support systems which have utilized symmetrical designs are unfavorable for erecting the speakers in a corner or up against the wall of a concert hall. Furthermore, a speaker presents a heavy load that exerts a substantial force as well as torque on the speaker stand; and, many prior speaker support structures have not provided the substantial support necessary to establish the speakers in a stable position while at the same time offering portability.

In regard to bicycles it is also necessary to be able to work effectively in front of the bicycle support structure. The bicycle often hangs off the support structure such that in some prior designs that utilized a symmetrical support base the legs of the support were oriented such that the user had to step on the legs while working on the bicycle.

In addition the housing of some prior designs which contains the attachment point for the legs of the support stand has often been quite high on the support structure—perhaps even as high as or higher than the waist of the bicycle repairperson. As a result the legs extending from the housing have interfered with the bicycle as it hangs down from the bicycle support stand. This interference has been unacceptable as it prevents the repairperson from effectively working on the bicycle.

Similarly, many prior designs which used a purely symmetrical relationship for their workstands have sacrificed space and efficiency by configuring the load support members of such devices immediately over the center of the symmetrical workstand. In regard to speaker loads and bicycle loads, this has forced those loads to be oriented either on the middle of the support stand or toward the front of the support stand. Much valuable floor space and perhaps stability of the supported load was sacrificed by such an arrangement.

Finally, prior systems have sacrificed either portability or structural support in trying to achieve the goals of providing a stable yet portable support. As a result there is a need for a system which can satisfy these goals and preferably at the same time.

SUMMARY

The present invention is directed towards a support system that provides an efficient structural support for a load while doing so in an efficient and cost effective manner. One embodiment of the invention utilizes a housing disposed near the ground coupled to two rotating members which in conjunction form a three point support on a support surface, such as a ground surface. From the housing, in this embodiment, a support member extends vertically relative to the ground surface to establish a location to receive a load such as a clamping arm for a bicycle. The rotating members are capable of rotating from an open position—in which the support stand is supported on the support surface—to a closed position. In the closed position, the rotating members can align such that both rotating members are in substantial alignment with the support member. Then, a releasable latch can be utilized to releasably latch the three members in alignment. In this fashion, the support stand can be quickly and easily collapsed from its open support position to its closed portable position. Furthermore the same releasable latch can be utilized to establish the support stand in both its open position and closed position.

In another embodiment of the invention, the support stand can be configured to establish three points of support for the support structure or workstand. In establishing these three points of support, two members can be utilized to establish all three points of support. In this fashion, there is a saving on material in that only two members are required rather than three as used in other designs.

In addition, another embodiment of the invention utilizes three legs stemming out from the housing of the support structure. The first two legs can be of similar length while the third can be shorter, while at the same time providing a stable support for the load. In this fashion, the support structure provides the stability required by the load while at the same time also providing a space saving arrangement to establish the load in a space that has space limitations.

An additional embodiment of the invention can utilize an off-center configuration which establishes the force receiving location on the support structure, i.e., the point for receiving a load from the load being supported, at a position which is off-center from the geometric center of the support structure. The geometric center is the center of the shape defined by the points of support in one embodiment. Another embodiment can establish this location off-center from the centroid of the support stand when it is in either an unloaded open position or a loaded open position. This can serve to provide a more stable configuration for a load from some previous designs which have utilized a purely symmetrical approach to supporting a load. Those symmetrical designs have failed to accommodate loads such as speakers or bicycles which might not be placed directly above the symmetrical support stand but rather might be placed off to the side of the support stand. Hence, the added load of the bicycle or speaker, for example, can tend to shift the center of mass of the speaker and load combination from the center of mass of the unloaded stand. As a result, the resulting loaded stand can be less stable in some symmetrical configurations.

As a result, it is a goal to provide a support stand that provides a point of support for a load such that the load will be supported in a stable configuration.

It is also a goal to provide a support stand that is portable and that can be easily established in such a portable position.

Furthermore, it is a goal to provide a stand for unusual loads that require workspace for the user and to accommodate that workspace by providing a unique footprint of the support base.

In addition, another goal is to provide a support stand that can be easily established against a wall or in corners or other types of spatial arrangements.

Furthermore, it is a goal to provide a stand that allows the structural members of the stand to be substantially aligned such that the stand can be made easily portable and stored.

Naturally, further objects of the invention are disclosed throughout other areas of this specification and claims.

BRIEF DESCRIPTION OF THE DRAWINGS

The features, aspects, and advantages of the present invention will become better understood with regard to the following description, appended claims, and accompanying drawings where:

DESCRIPTION

As can be easily understood, the basic concepts of the present invention may be embodied in a variety of ways. It involves both support and positioning techniques as well as devices to accomplish such techniques. In this description, the support and positioning techniques are disclosed as part of the results shown to be achieved by the various devices described and as steps or acts which are inherent to utilization. They are simply the natural result of utilizing the devices as intended and described. In addition, while some devices are disclosed, it would be understood that these not only accomplish certain methods but also can be varied in a number of ways. For example, modifications can be made to combine features of the disclosed embodiments in a variety of configurations. Importantly, as to all of the foregoing, all of these facets should be understood to be encompassed by this disclosure.

Figure 1:
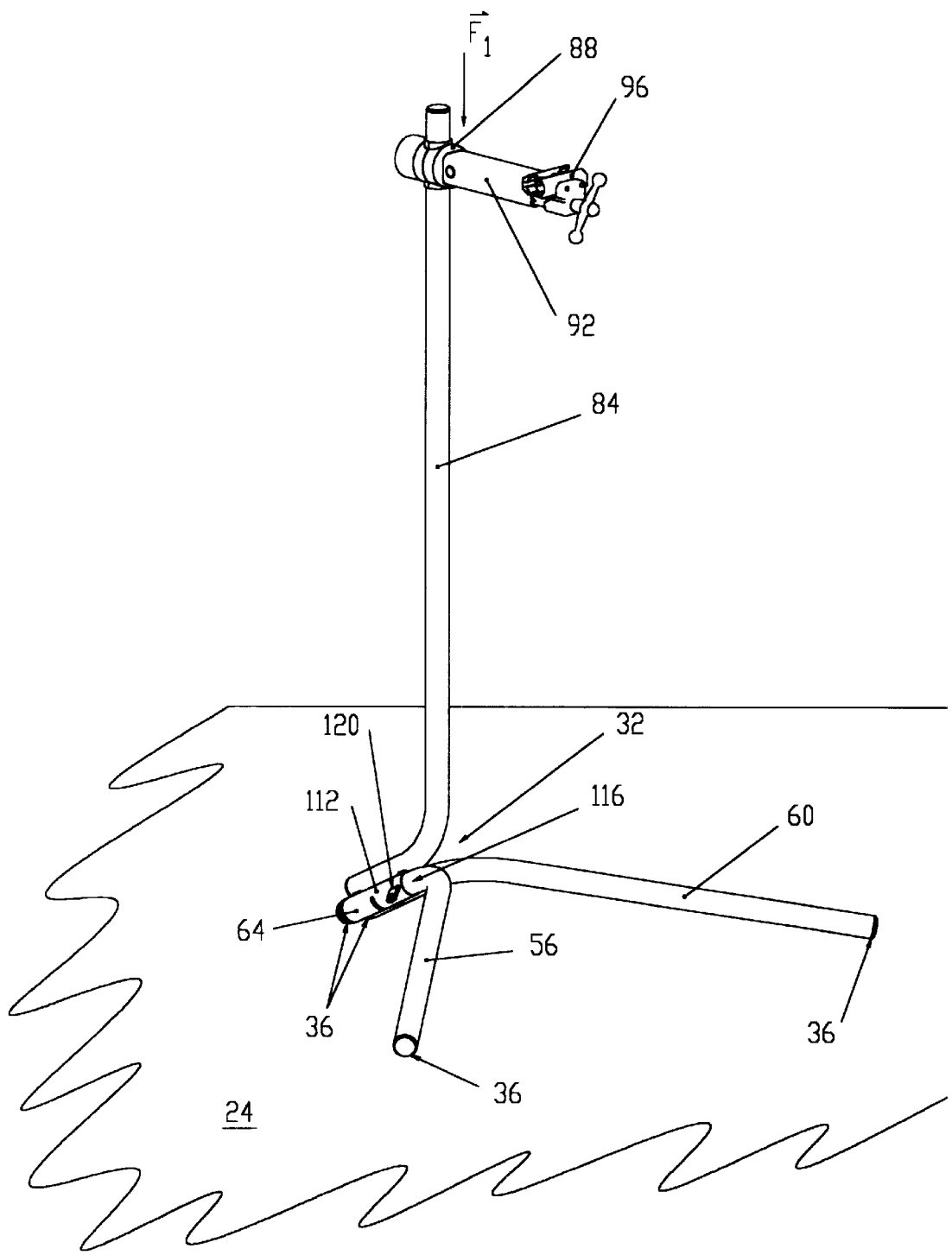
FIG. 1 shows a perspective view of one embodiment of the workstand erected in an open position on a support surface.
Figure 2:
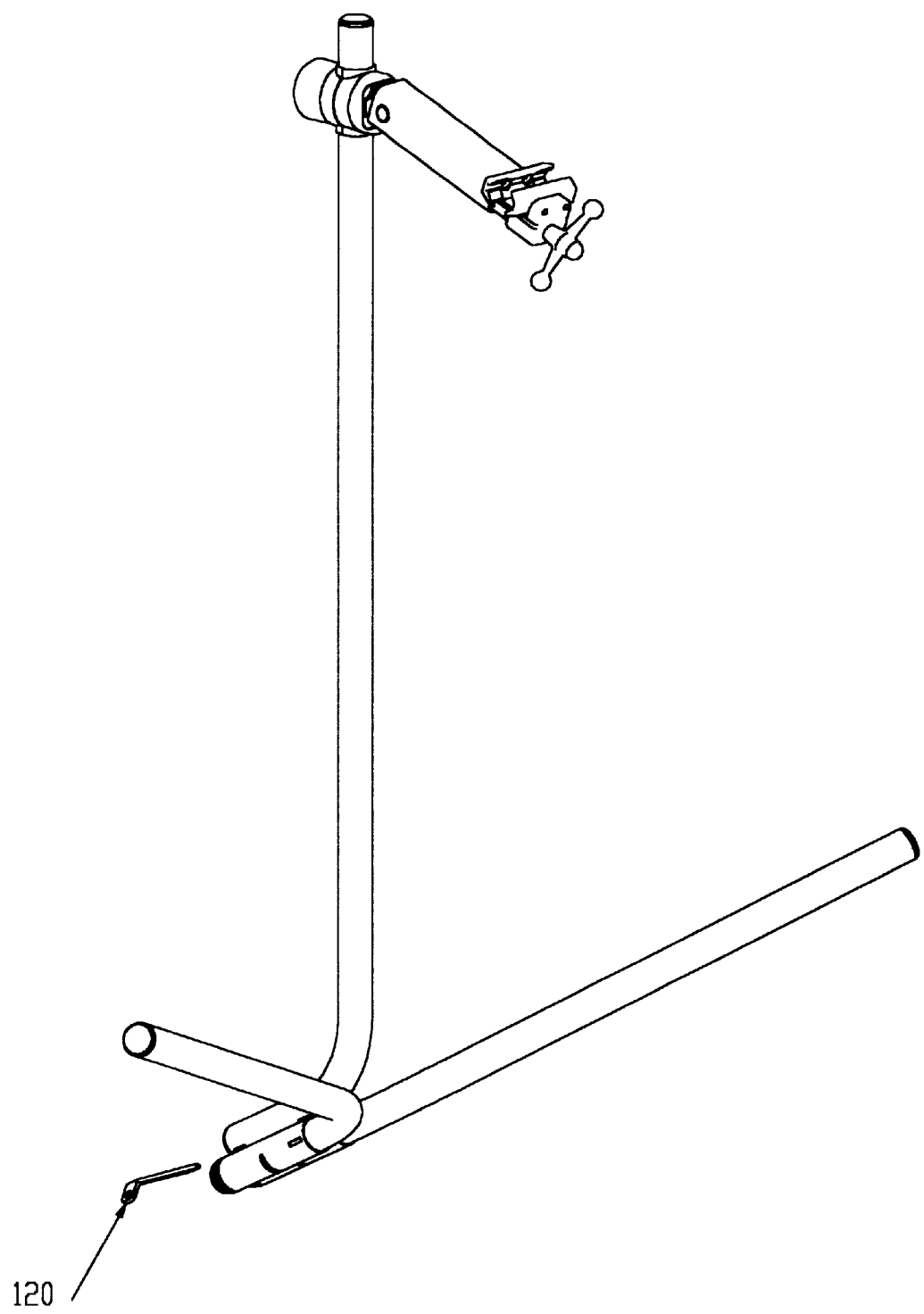
FIG. 2 shows the workstand of FIG. 1 in a partially closed position from that shown in FIG. 1.

Referring now to FIG. 1, an embodiment of the invention can be seen. In FIG. 1, a support stand or workstand (20) is established in an open position on a support surface, such as the ground surface of a workshop or a bleacher in a concert arena. The support member is shown extending from a position off-center of the support stand upwards relative to the ground support surface and presenting a clamping arm (92) coupled to a location on the support member. Furthermore, a force vector $F_1$ can be seen oriented downward, i.e., toward the support surface) at a force receiving location on the support member, such as a clamping point on the load support member where the clamp is coupled to the load support member. This force represents the force on the load support member (84) from a bicycle load clamped to the clamping arm (92) at the clamp (96). The workstand (20) can accommodate a variety of loads. For example, the embodiment shown in FIG. 1 is particularly suitable for bicycle and speaker loads. Throughout this specification bicycle loads may be used as examples, for the sake of simplicity. However, it should be understood that other loads, especially speaker loads, can be accommodated by this system just as easily.

Figure 5:
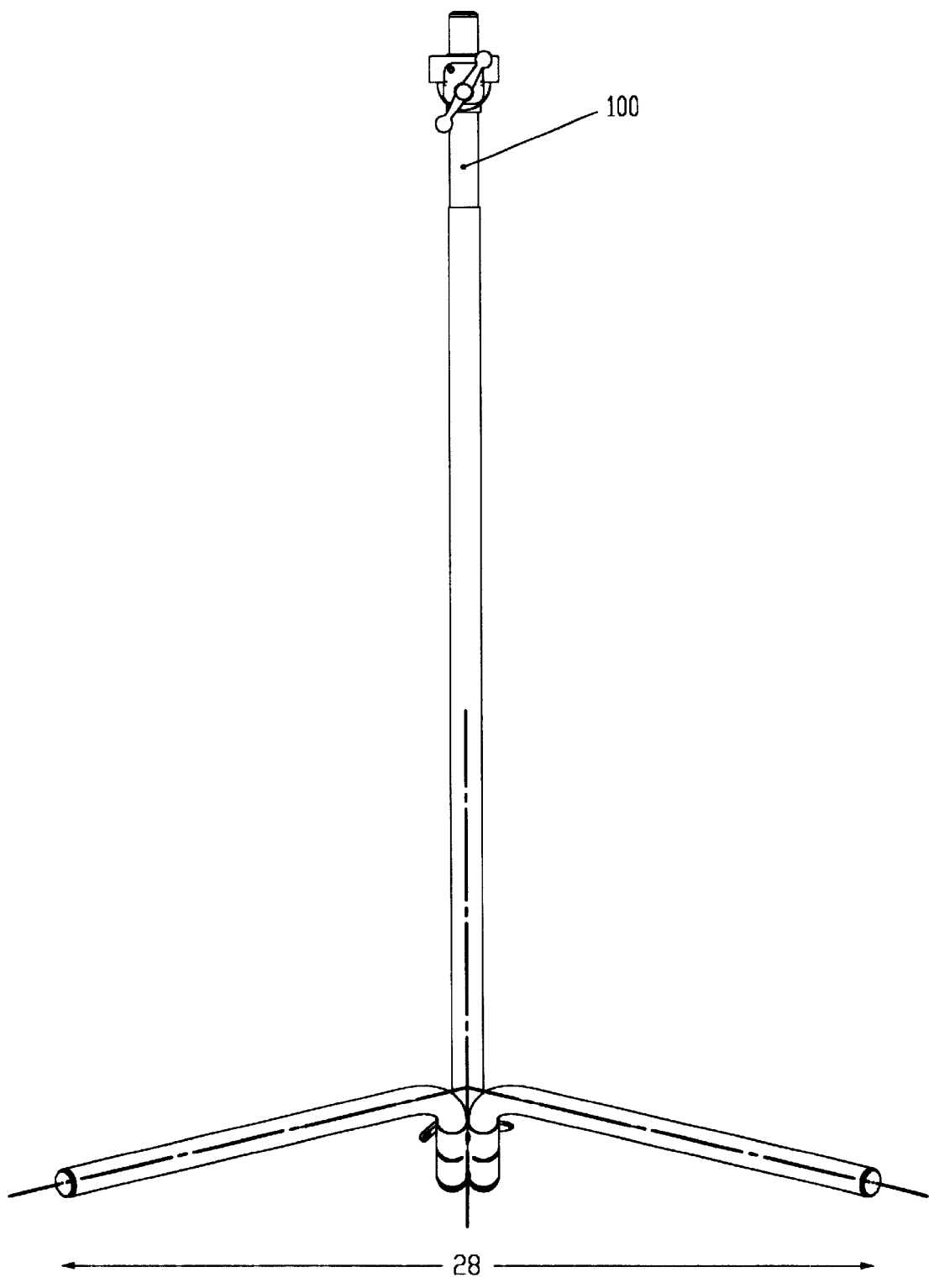
FIG. 5 shows a front view of one embodiment of the workstand with two legs oriented substantially away from the workspace of the user as well as a telescoping support member.

In FIG. 1 a workstand (20), such as a bicycle workstand or speaker support stand, is shown in an open position on a support surface (24). An open position is considered to be the position the support stand is configured in when the workstand is configured to receive a load or is supporting a load. In front of the workstand (20) a workspace can be defined. As shown in FIG. 5, this workspace (28) is shown as the space immediately in front of the workstand where a user's feet typically would be situated when working with the load supported by the workstand. For example, in regard to a bicycle load, the workspace (28) would be immediately in front of the bicycle such that a repairperson could conveniently work on the bicycle while not being hampered by the support legs from the workstand. Similarly, for a speaker support, the workspace would be the area of open space immediately in front of a workstand where a person would step in order to load or unload the speaker. A support base (32) is shown coupled to a support member (84) in FIG. 1. This support base (32) can be adapted or configured to establish points of support, e.g., three points of support (36), for the support stand. These points of support can be seen in FIG. 1 as the areas on the support surface where the feet of the support stand contact the support surface (24). Three points of support are shown in FIG. 1, although any number could be utilized in some embodiments of the invention. The three points of support can also be seen in FIG. 6. A three point support is often useful because it facilitates alignment of a support stand on an uneven surface.

Figure 6:
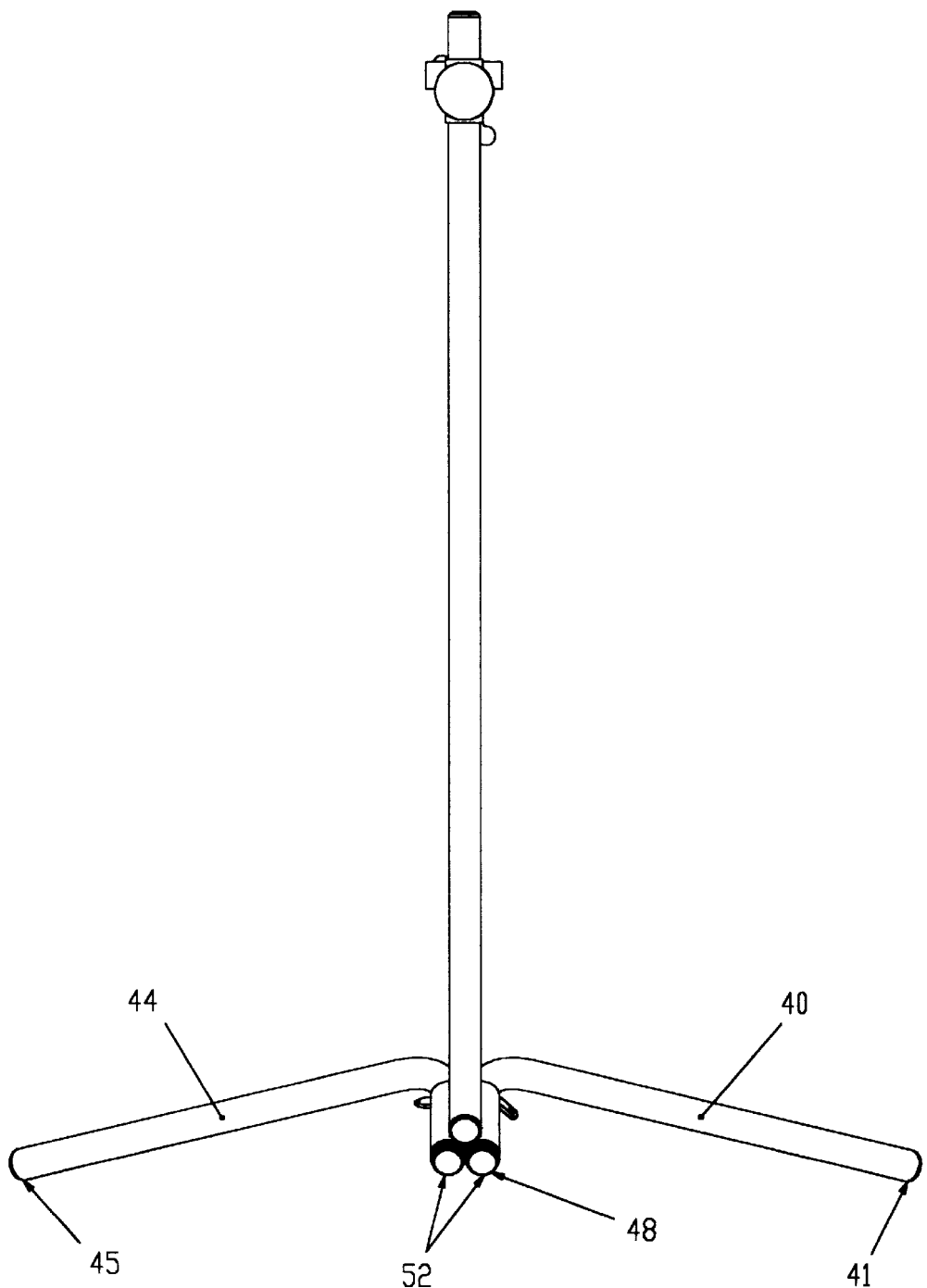
FIG. 6 is a rear view of the workstand of FIG. 5.

The support base can be comprised of various members to establish the support base. For example, to establish the three point support shown in FIG. 6, a first member (40) and a second member (44) can be utilized. The first member (40) can establish a first point of support (41) of a multi-point support, such as a three point support. Furthermore, the second member (44) can be utilized to establish a second point of support (45). Finally, a third point of support (48) can be established either by the first member (40) or the second member (44). This is a unique design in that many prior designs have failed to realize that a three point support can be established using only two individual members rather than requiring three members to establish the three points of support. (It should be understood that the housing coupling the members or frictional pads on the feet of the members might be present without deviating from a two-member definition.) In addition, the two members (40) and (44) can be utilized to establish the third point of support in conjunction with one another (52) as shown in FIG. 6. In this case both members (40) and (44) are establishing contact with the support surface simultaneously and in proximity to one another such that they are considered to be a single point of support. For purposes of this patent, it should be understood that where two members provide support in close juxtaposition (i.e., a close side by side relationship) with one another, as shown by example in FIG. 6, they shall be deemed to be a single point of support.

Figure 7:
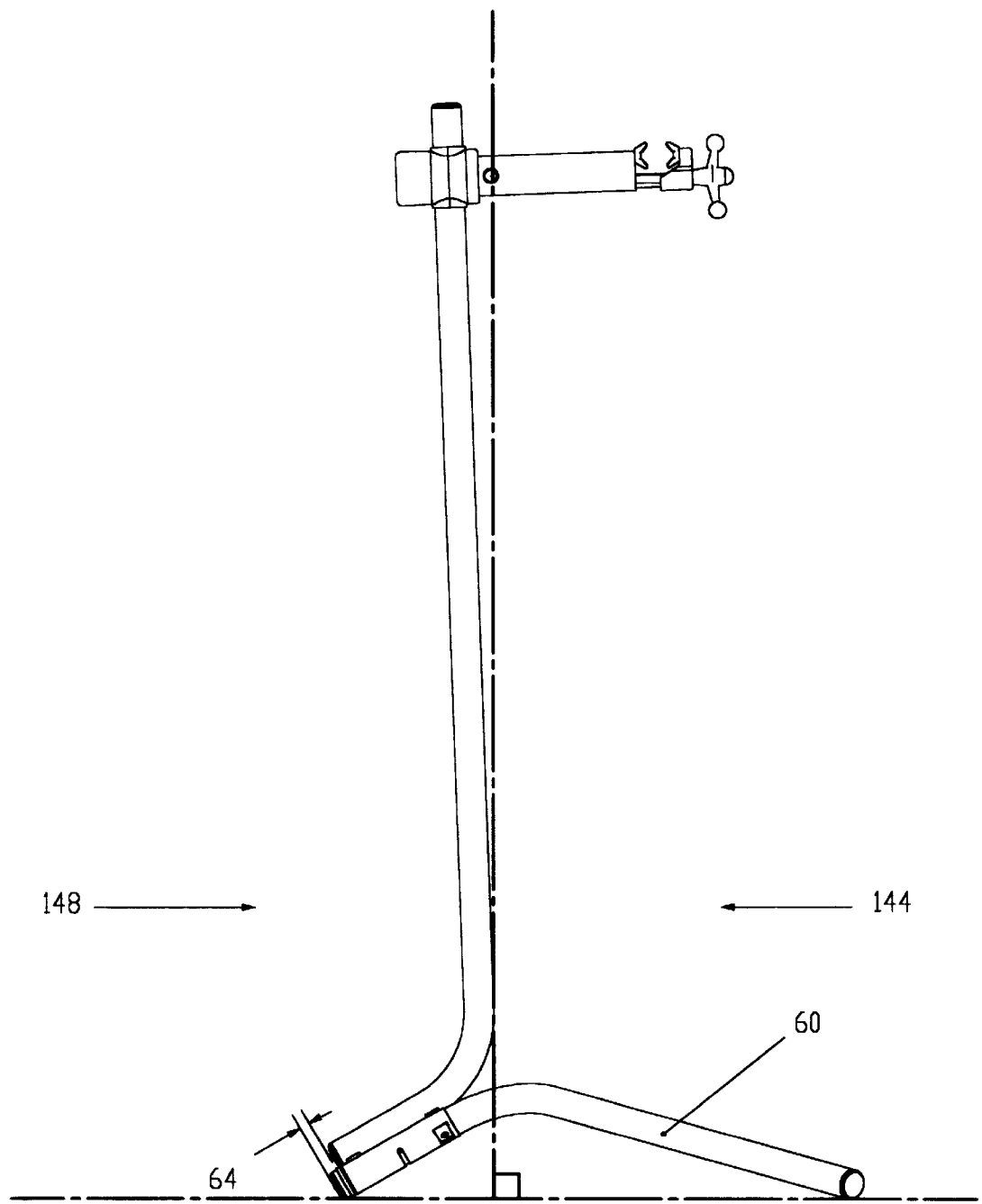
FIG. 7 shows a left side view of the workstand shown in FIG. 5, which would have a similar right side view.
Figure 8:
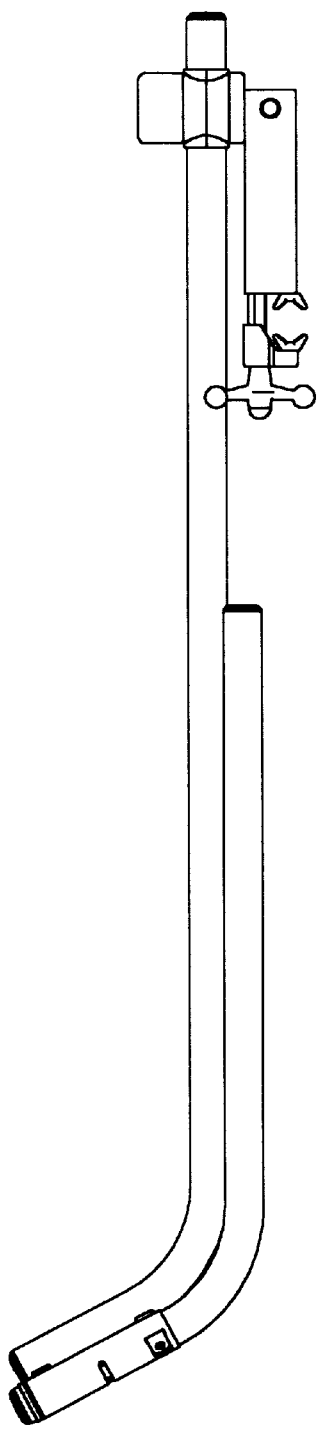
FIG. 8 shows a side view of a workstand in its final closed position.
Figure 9:
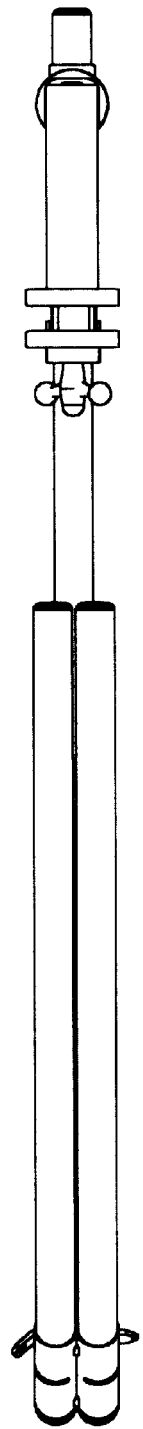
FIG. 9 shows a front view of a workstand in a final closed position.
Figure 10:
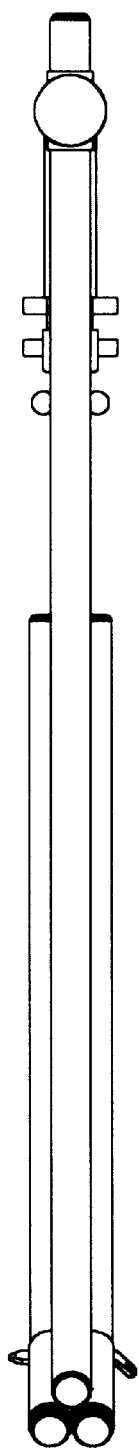
FIG. 10 shows a rear view of a workstand in a final closed position.

Turning once again to FIG. 1, one can see that the support base (32) can be comprised of first leg (56) and second leg (60). As shown in FIG. 1 these legs can be angled substantially away from the workspace immediately in front of the workstand (20). In FIG. 5, the relationship of the legs of the workstand is shown. The angle created by the first leg (56) with the imaginary line drawn between the center of the support base and the point immediately in front of the center of the workstand is shown in FIG. 5 as angle $\alpha$. Furthermore, the second leg (60) and the imaginary line is shown as angle $\beta$. In some instances, the sum of angles alpha and beta may be in the range of 170 to 90 degrees. Finally, as can be seen in FIG. 1, a third leg (64) is shown. This third leg is also shown in FIG. 7. As can be seen, one embodiment of the invention allows the third leg to be substantially shorter than the first and second legs. It is considered that a leg is substantially shorter when it is visually recognizable as shorter relative to the first or second leg without the necessity of measuring the individual distances. Furthermore, it is considered that the length of a leg is determined from where the individual legs all come together or join. In this instance, the three legs are joined by a housing. Therefore, in this embodiment, the first and second legs would be measured as the direct distance between the point where those legs first leave the housing to where they eventually contact the ground surface. Similarly, the length of the third leg would be the direct distance between where the third leg first leaves the housing to where the third point of support is established by the first and second legs forming a third point of support. This distance can be seen in FIG. 7 represented by the bracketed region designated as (64).

In another embodiment of the invention, the third leg can be shorter than the first and second legs while the first and second legs need not be exactly the same length. Rather the first and second legs could be of similar length while the third leg could be of substantially different and shorter length. It is not intended that the first and second legs necessarily be exactly the same, but rather, that they be recognizably of similar lengths relative to the difference in length created by comparison to the third leg.

In one embodiment of the invention, the shorter third leg can be oriented to the rear side of the workstand. For purposes of this specification, the front side of the workstand (144), as shown in FIG. 7, would be the area immediately in front of the legs of the first and second members which are angled outward to present an area of workspace. Furthermore, the side opposing the front side would be considered the rear side (148) of the workstand, as shown in FIG. 7. This third and shorter leg can be very useful for establishing the workstand against a wall in a location where workspace is at a premium. Furthermore, this design lends itself to establishing the workstand in a corner of a room. This is not only useful for bicycle repair work, but it is also useful for speaker stands which are often located in corners or tight spaces. Generally, this embodiment of the invention is useful for areas where one wishes to position a load in a space that is confined or where space is at a premium, such as in a retail store or a garage of a person's home or similar area.

In regard to the legs of the support base (32), one embodiment of the invention can utilize legs having a fixed length rather than telescoping lengths. This is desirable from the vantage point that it utilizes a member having a sturdy configuration that will not collapse under load as latches of a collapsible (i.e., adjustable) embodiment might have more of a tendency to do. Furthermore, fixed members provide a stable configuration when they are rotated to their storage position. This also facilitates carrying of the workstand as one need not worry about an adjustable leg sliding around or the need to latch multiple latches as is necessary in closing many collapsible support stands. Finally, fixed members can easily be made from inexpensive material thus providing a lower cost to a workstand with fixed members rather than one that requires adjustable members. And, in addition, such materials can often be sturdier in their strength qualities than those utilized to create a collapsible member.

In making these embodiments, the preferred materials of manufacture are tubular steel for the support legs as well as the load support member (84). The housing is also preferably made of steel such that a socket is provided for the tubular legs. Furthermore, a socket can be provided for the support member as well. The support members can be welded to one another or the housing. However, where rotatable members are desired, it is preferred to insert the tubular members within a socket of the housing and allow them to rotate about the axis of the housing, typically a fixed axis. A rivet system can be used to secure the member to the housing to permit free rotation of the member as one of ordinary skill in this art would readily understand. Materials having a high coefficient of friction such as rubber or soft plastic can be utilized at the ends of the members to provide frictional contact points on the support surface to keep the support from sliding. In addition a simple pushbutton detent can be used on the telescoping member to secure it in a closed, intermediate, or fully extended position. Finally, a simple metal bar can be inserted through cooperating alignment holes on the support members and housing to secure the support members in their open as well as closed positions.

Figure 11:
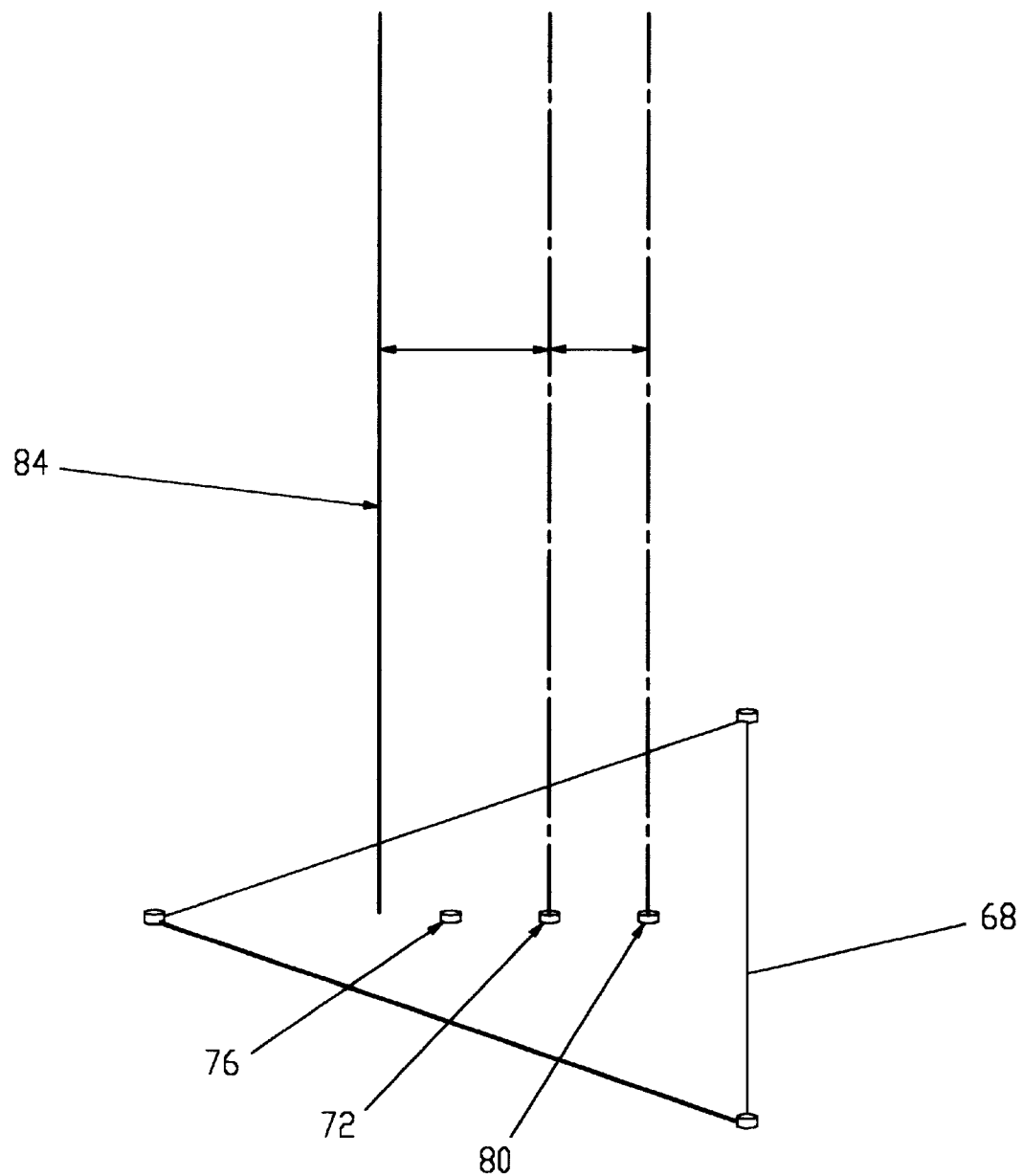
FIG. 11 shows a geometric model of a shape defined by points of support of a workstand and the geometric relationship of a support member relative to a geometric center of the shape, an unloaded centroid of the workstand, and a loaded centroid of the workstand.

As can be seen in FIG. 1 and FIG. 11, the support base (32) can establish a shape (68) defined by points of support (36). An actual physical point of support typically will not be a single finite point, but rather, typically a small surface area. Therefore, it is understood that for purposes of determining the shape, the center of each small surface area of each point of support on the support surface shall be deemed the point of support. As can be seen in FIG. 11 (not necessarily drawn to scale), the shape defined by the workstand shown in FIG. 1 is a triangle. The first point of support of the first leg (56), the second point of support of the second leg (60), and the third point of support of the third leg (64) establish a shape of a triangle on the support surface. It can be easily understood that such a shape has a geometric center (72)—a point equidistant from each of the three points of support.

As can be seen in FIG. 11, a particular support stand will have a centroid or center of mass in its unloaded position. That is to say, that when a bicycle (or speaker, for example) is not being supported by a workstand in its set-up or open position, that the workstand still has a center of mass (76) or centroid as shown in FIG. 11. This could also be referred to as the unloaded centroid of the support stand. Furthermore, in some configurations, once the workstand is loaded, that is, carrying the load of a bicycle (or speaker, for example), the center of mass of the workstand, or loaded centroid (80), can be seen to have moved from the unloaded centroid (76) position—typically this is the case when the load is not positioned on the workstand immediately above the center of mass of the unloaded workstand. Therefore, in one embodiment of the invention, it is desirable to position the load support member (84) (such as a bicycle support member or speaker support member) in a position where the force receiving location on the support member system will be located off-center from the centroid of the workstand when the workstand is in a loaded condition. In this manner, once a load is established on the workstand the center of mass or centroid of the loaded workstand will shift to a preferred point for such a load. In this manner, the load is supported in a stable position whereas in some prior systems the position of the load support member has tended to make the workstand less steady once a load was added. Therefore, this embodiment facilitates a stable configuration for the support stand under a loaded condition. Typically, this is accomplished by configuring the support member such that it is toward the rear side of the support stand relative to the centroid.

Similarly, it might also be desirable in some configurations to locate the force receiving location on the load support member off-center from the unloaded centroid. In some arrangements, however, it still might be preferred to configure the support stand such that the force receiving location is positioned over the geometric center, loaded centroid or unloaded centroid of the workstand when the workstand is configured in an open position.

For purposes of this specification, the term "off-center" is understood to mean a position to the side of a designated point, but not necessarily on the same horizontal plane as the designated point, when the horizontal plane is taken relative to a support surface. This can be seen in FIG. 11. Typically, the point to be located off-center will be above the reference point (relative to a ground surface) but off to the side. Since there may be a need to approximate point positions and shapes in some configurations, the distance which a force receiving location must be off-center from a reference point should be based on the average cross-sectional area of the support member of the workstand and the diameter of a circle having an equivalent cross-sectional area. This should permit enough room to compensate for any approximations that had to be made. For example for a workstand having a square shape with an area equivalent to a circle of diameter 1.5 inches, any workstand that located the force receiving location on the workstand more than 1.5 inches from the designated point (along a horizontal plane) would be deemed to be off-center. It is envisioned, however, that for bicycle and speaker supports that the force receiving location shall be positioned a substantial distance off-center, perhaps as much as six inches to two feet or more.

As can be seen in FIG. 1, a load support member (84) is coupled to the support base (32). In one embodiment, the support member can be welded to the support base. This support member can be referred to as a bicycle support member or speaker support member when those types of loads are being supported. A coupling point can be defined for the load support member as the point where the load support member is attached to the support base. For designs that utilize a long weld to attach the support member to the support base, the center of the weld or other similar manner of attachment would be considered the coupling point. A force receiving location (88) is disposed along the load support member (84). In one embodiment of the invention a telescoping support member (100) can be utilized. This might involve a design featuring a member disposed within a cylinder having alignment holes such that a detent mechanism disposed on the member could be utilized to establish the member in any one of the alignment holes.

The load support member (84) can be coupled to the support base (32) of the workstand (20) at a location that varies from the geometric center of the shape defined by the points of support established by the support base (32). In this fashion the support member can establish the force receiving location along the support member in a position that provides a superior support for some loads being supported. For example, the load support member (84) can be established behind the geometric center such that it is coupled to the support base at a position behind the geometric center and rises upward relative to the support surface to establish the force receiving location (88) behind the geometric center of the shape defined by the three points of support. Then, when a load, such as a bicycle or speaker is established on the workstand, the force from the bicycle or speaker will be located immediately above the geometric center of the three point support. In addition, one might even locate the load behind (i.e., toward the rear side (148) of the support stand relative to the geometric center) the geometric center of the shape defined by the support base to configure the workstand in a more stable position. Prior designs have often utilized merely a symmetrical stand that oriented the load support member (84) on the support base directly above the geometric center of the shape of the three point support defined by the support base. This led to the load being placed outward in one direction or another from the geometric center of the shape defined by the three points of support. As a result, the load was in a less stable position than one would prefer. To manipulate the position of the force receiving location, a curved support member can be used. One embodiment of such a curved member can be seen in the figures. In that embodiment, the member curves from where it is coupled to the support base and then begins to rise in a substantial vertical arrangement. Furthermore, a load support member can be configured or shaped to slope in a non-vertical fashion relative to the support surface. In this manner the force receiving location can be varied by the load support member. A telescoping load support member facilitates this manipulation even further.

Figure 3:
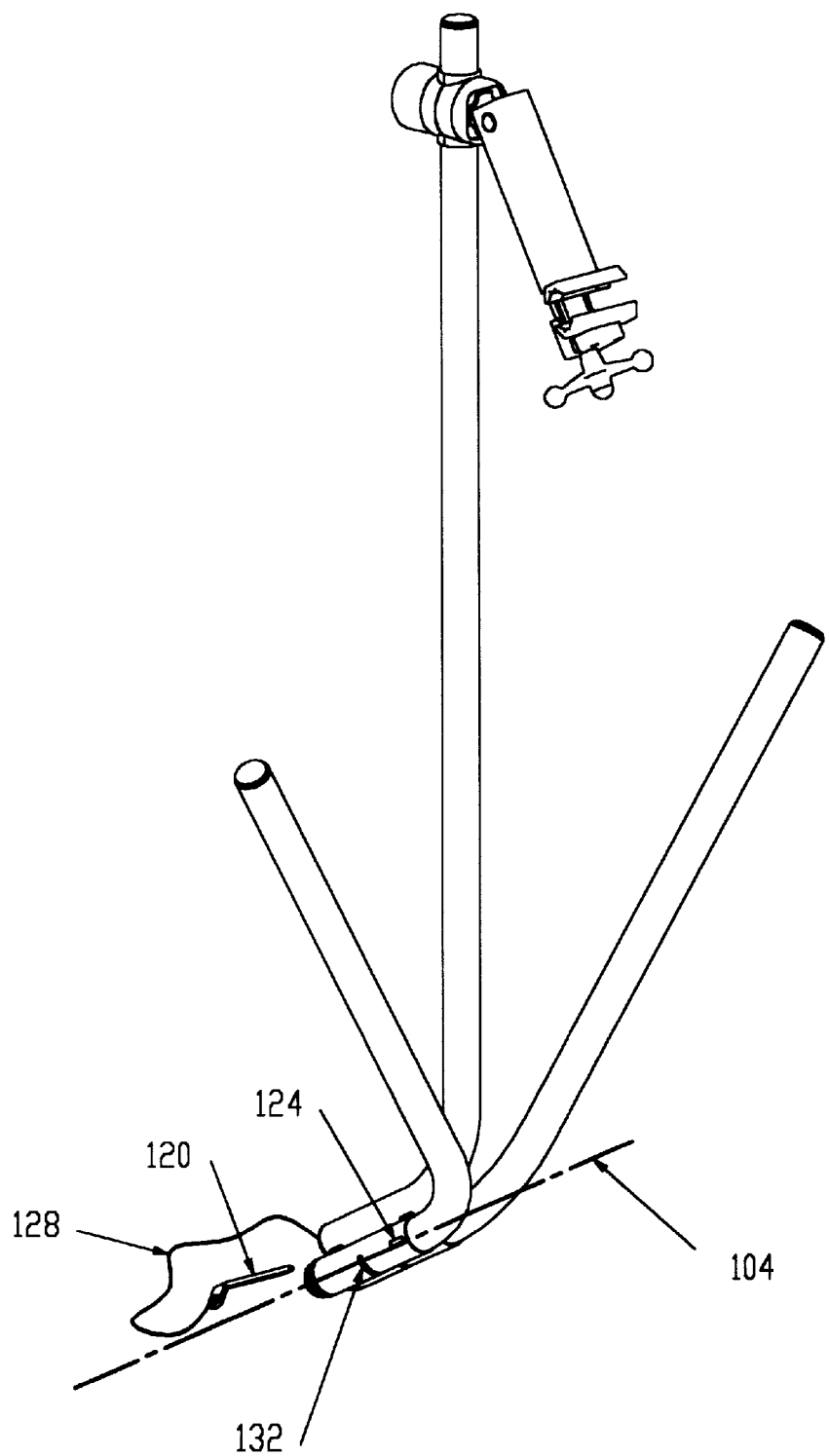
FIG. 3 shows the workstand of FIGS. 1 and 2 in a further closed position.

In another embodiment of the invention, at least one rotatable member can be utilized for the workstand. Such a rotatable member might be as shown in FIGS. 1 through 4. As can be seen in those figures the first leg (56) and second leg (60) are rotatable relative to a fixed axis of the housing such that the members rotate from their open support position to a closed transportation position. Many prior designs have failed to appreciate this technique. By use of such a rotatable member, the member can be established on a fixed axis (104) [as shown in FIG. 3] in both the open and closed position while at the same time being rotatable from the open to closed position. This can be seen in FIGS. 1 through 4 where the end of the rotatable member disposed in the housing (112) is essentially stationary relative to the housing while the end of the member disposed on the ground surface in FIG. 1 is capable of rotating back towards the workstand and capable of being established in a closed position as shown in FIG. (4). Furthermore, one embodiment of the invention can utilize more than one rotatable member. For example, as shown in FIG. 1 through FIG. 4, two rotatable legs of a workstand are utilized. It can also be seen that the load support member (84) could be made rotatable as well by establishing it within a housing similar to that shown for the first and second rotatable members. One could also retain one of the legs as stationary or fixed and utilize a rotatable load support member and one rotatable leg to establish a similar configuration. In such a configuration, one would simply rotate the load support member and the one rotatable leg towards the fixed leg to establish the workstand in a closed position. Where two rotatable members are utilized, the axes of these members can be in parallel or even substantial parallel alignment, as well as disposed side by side in sockets of a housing.

One desired goal of one embodiment of the present invention is to provide a workstand that is portable such that it can be collapsed and easily carried or stored by a user. As can be seen in FIGS. 1 through 4, the workstand (20) shown there is rotatable to a closed position in which the rotatable legs are substantially aligned with the load support member (84). This substantial parallel alignment (108) can be seen in FIG. 4 especially. It should be understood that for substantial parallel alignment the leg portions of the first and second rotatable members disposed along the load support member (84) can be established in a substantial parallel alignment with the load support member (84) while the remaining ends of those rotatable legs might not necessarily need to be established in alignment. However, in the embodiment shown in FIG. 4, it is preferable to have both ends of the rotatable legs established in the rough parallel alignment with one another. In this fashion, the ends disposed in housing (112) are in alignment, while the ends disposed along load support member (84) are also in alignment. Furthermore, it should be understood that substantial parallel alignment is intended to mean that the members do not diverge from one another at an angle greater than twenty degrees.

Figure 4:
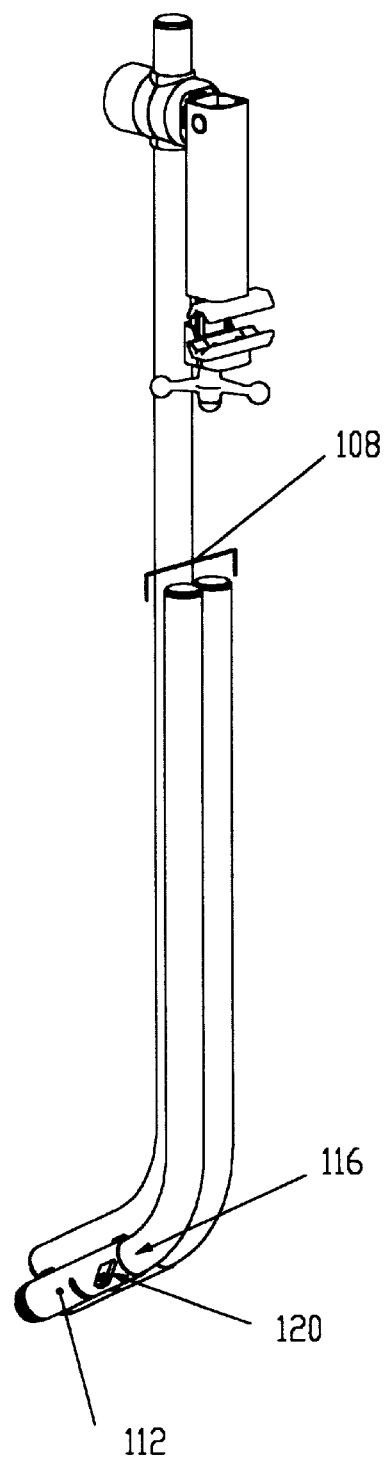
FIG. 4 shows the workstand shown in FIGS. 1, 2 and 3 in a final closed and releasably latched position with the rotatable members in substantial parallel alignment with the support member of the workstand.

As shown in FIG. 1, a housing (112) can be utilized. This housing (112) can have a socket (116) within which a rotatable member can be inserted. Such a rotatable member made of metal tubing can be disposed within the socket (116) and retained via retaining clips or rivets, as one of ordinary skill in the art would easily understand. The rotatable member can be rotated relative to the housing. Furthermore, such a rotatable member can be rotated relative to a fixed axis of a socket of the housing. A releasable latch can be utilized to latch at least one rotatable member in at least one position. Normally it would be desirable to latch a rotatable member in the open position. However, one embodiment of the invention allows a releasable latch to be utilized to establish the rotatable member in both an open and a closed position. Furthermore, it accomplishes this not only for one rotatable member but for two rotatable members. This can be seen in FIG. 4 and FIG. 1 where the locking pin (120) shown in a removed position in FIG. 3 is insertable through an alignment hole (124) shown in FIG. 3. This alignment hole is disposed in proximity to a hole on the rotatable member such that in the open position the hole on the rotatable member is positioned against alignment hole (124) such as to allow the locking pin (120) to be inserted. Furthermore, when the rotatable member is rotated to a closed position, once again the alignment hole (124) is disposed in proximity to an opening in the rotatable member such that locking pin (120) can be inserted to retain the rotatable member in position. Furthermore, as shown in FIG. 4, one can easily see that the locking pin (120) can be pushed through the alignment hole of the housing and the holes provided by the two rotatable members through the outside of the housing. In this fashion, the two rotatable legs are releasably latched in a closed position and the workstand is ready to be transported to a new location or stored for later use without taking up a great amount of floor space. As shown in FIG. 3, a retainer (128), such as a cord, can be utilized to retain the locking pin to the workstand. Furthermore, a channel (132) can be seen in FIG. 3 and as one of ordinary skill would understand, a projection on the rotatable member, or perhaps a pin extended through the rotatable member, can swivel along channel (132) which defines the degree of rotation that the rotatable member can accomplish and also retains the rotatable member in the socket. For example the end of the channel apparent in FIG. 3 would be the closed position of the rotatable member.

In one embodiment of the invention the housing (112) is adapted to be located in close proximity to a ground surface. It should be understood that close proximity for a particular stand supporting a particular load may have different definitions. However, for purposes of a bicycle load, in particular, the housing should be disposed well below the support point for the bicycle such that the housing is located low enough such that the legs of the workstand projecting from the housing do not interfere with the supported load. In the case of a workstand supporting a bicycle, this would typically be only a few inches from the ground whereas for the case of a speaker stand, it may be somewhat higher. The housing can be disposed on the short leg of the support base as described for one earlier embodiment of the invention described above. In one embodiment, the housing can located close to the ground surface while permitting the legs to extend above the housing before turning back toward the ground or support surface. This is a unique design in comparison to many prior systems in that the housing which couples the legs is oriented closer to the ground than some portions of the legs. In one embodiment of the present invention, it facilitates establishing a low profile support base as well as rotatable legs. As can be seen in the figures, this can be accomplished in part using curved members for the legs which extend upward from the housing (relative to the ground surface) before bending back toward the ground surface.

The method of operation of the workstand can be seen in the various figures. For example in FIGS. 1 through 4 the method of closing the workstand can be seen. In FIG. 1 the workstand is oriented in its open support position on a support surface (24). The workstand is established in an open position as well as in a releasably locked position through the use of the releasable latching system shown in FIG. 3. The load support member (84) is shown in a collapsed position. If this were the embodiment that used a telescoping member, however, the figure might reflect the lowest level of the telescoping member. As shown in FIG. 5, such a telescoping member can be oriented in a higher position. One could easily establish such a telescoping member in position through the use of a detent mechanism.

To establish the workstand in a support position on a support surface, a user may first provide a housing (112) in which a first and second member can be coupled to the housing. Next, the first member can be rotated about a socket of the housing and established in a support position for the first member. Next, the second member can be rotated about its socket of the housing to establish the second member in a support position. A load support member, such as a bicycle support member or a speaker support member, can be coupled to the housing and established in a position such that the load support member is located behind a geometrical center of the space defined by the support base. The load support member can be established in a non-perpendicular position relative to the support surface such that the load support member is not perpendicular to the support surface. Once the workstand is established in position upon a support surface with the legs oriented in their respective positions and the load support member established in an upright position, the workstand has been established in an open position. Alignment holes can be provided on the workstand to latch the rotatable members in either an open or closed position as well as intermediate positions between the open and closed positions. In any of these positions, a releasable latch can be used to accomplish the act of releasably latching the rotatable member in one of the above mentioned positions. A first member not yet oriented in the open position can be rotated about the axis or even a fixed axis provided by the housing. Similarly, the same can be accomplished with a second rotatable member of the workstand. When one desires to close the workstand one need only remove the latching mechanism that releasably latches the workstand in the open position by sliding, for example, a locking pin from a housing having alignment holes. Then, at least one of the rotatable members can be rotated toward a fixed member to establish the rotatable member in a substantially parallel alignment with the fixed member. Other methods of releasable latching can be utilized as well. In addition, it is conceivable that there need not be a fixed member but that all members are rotatable and may even rotate into a substantial parallel alignment with one another. Next, one can rotate a second rotatable member toward the fixed member such as load support member (84) and establish both rotatable members in substantial parallel alignment with the load support member, which may or may not be a fixed member. Next, one can release the releasable latch on the clamping member and fold the clamping member into parallel alignment with the load support member (84) as shown in FIGS. 1 through 4. Finally, one may release the detent mechanism on the telescoping load support member and establish the telescoping load support member in its closed position as would be indicated in FIG. 4. As a result of these steps, the workstand can take on the configuration of FIG. 4 which is a substantially parallel alignment of the support member with the load support member in stark contrast to the open position shown in FIG. 1 where a great deal of space is required for the workstand. Furthermore, once the legs are oriented in a substantially parallel alignment, the locking pin can again be established through the alignment holes of the housing and holes of the rotating member to establish a releasably latched arraignment.

The foregoing discussion and the claims that follow describe the preferred embodiments of the present invention. Particularly with respect to the claims it should be understood that changes may be made without departing from the essence of the invention. In this regard, it is intended that such changes would still fall within the scope of the present invention. It is simply not practical to describe and claim all possible revisions which may be accomplished. To the extent such revisions utilize the essence of the present invention, each naturally falls within the breadth of protection encompassed by this patent. This is particularly true for the present invention since its basic concepts and understandings are fundamental in nature and can be applied broadly in a variety of ways. Further, it should be understood that various permutations and combinations of the elements shown in the claims are possible and should fall within the scope of this disclosure.

What is claimed is:

1. A bicycle workstand comprising:
   a) a support base to support the workstand on a support surface;
   b) a plurality of points of support of the support base to contact the support surface;
   c) a shape defined by the plurality of points of support of the support base;
   d) a geometric center of the shape defined by the plurality of points of support;
   e) a bicycle support member coupled to the support base at a position off-center relative to the geometric center of the shape defined by the plurality of points of support of the support base;
   f) a force receiving location on the bicycle support member to receive a force from a bicycle mounted to the workstand.

2. A bicycle workstand comprising:
   a) a support base to support the workstand on a support surface;
   b) a bicycle support member coupled to the support base;
   c) a force receiving location on the bicycle support member to receive a force from a bicycle when a bicycle is mounted to the workstand;
   d) an open position of the bicycle workstand when erected on the support surface to receive a bicycle; and
   e) a centroid of the bicycle workstand when positioned in the open position and while not supporting a bicycle load;
   wherein the bicycle support member is coupled to the support base at a position off-center from the centroid.

3. The bicycle workstand as described in claim 1 and further comprising:
   a) a front side of the workstand to access a bicycle attached to the workstand; and
   b) a rear side of the workstand opposite from the front side;
   wherein the force receiving location on the bicycle support member is located off-center toward the rear side relative to the geometric center of the shape defined by the points of support.

4. The bicycle workstand as described in claim 1 wherein the force receiving location on the bicycle support member is located on-center with the geometric center of the shape defined by the points of support.

5. The bicycle workstand as described in claim 1 and further comprising:
   a) a front side of the workstand to access a bicycle attached to the workstand; and
   b) a rear side of the workstand opposite from the front side;
   wherein the force receiving location on the bicycle support member is located off-center toward the rear side relative to the centroid.

6. The bicycle workstand as described in claim 5 wherein the bicycle workstand has a loaded centroid when in the open position and under a load from a bicycle, and wherein the force receiving location on the bicycle support member is also located toward the rear side relative to the loaded centroid.

7. The bicycle workstand as described in claim 1 wherein the force receiving location on the bicycle support member is located on-center with the centroid.

8. The bicycle workstand as described in claims 1 or 2 and further comprising a telescoping bicycle support member.

9. The bicycle workstand as described in claims 1 or 2 and further comprising:
   a) a front side of the workstand to access a bicycle attached to the workstand;
   b) a rear side of the workstand opposite from the front side of the workstand; and
   c) a three point support comprising a first, second and third leg;
wherein the third leg of the three point support is shorter relative to the first and second leg and wherein the third leg is oriented on the rear side of the bicycle workstand.

10. The bicycle workstand as described in claims 1 or 2 and further comprising a three point support comprising a first, second and third leg, wherein the third leg of the three point support is shorter relative to the first and second leg.

11. The bicycle workstand as described in claim 10 wherein the front side of the workstand defines a workspace for the feet of a user and wherein the first and second legs are angled substantially away from the workspace.

12. The bicycle workstand as described in claims 1 or 2 and further comprising at least one rotatable member.

13. The bicycle workstand as described in claim 12 wherein the rotatable leg is configured to align in substantial parallel alignment with the bicycle support member.

14. The bicycle workstand as described in claim 13 and further comprising a second rotatable member, wherein the rotatable members are coupled to the support base so as to rotate into substantial parallel alignment with the bicycle support member.

15. A method of providing a workstand support for a bicycle, the method comprising the steps of:
   a) providing a support base to support a workstand on a support surface, the support base having a geometric center;
   b) utilizing a plurality of points of support of the support base to contact the support surface, the plurality of points of support defining a shape having a geometric center;
   c) coupling a bicycle support member to the support base at a coupling point on the support base, the coupling point located off-center from the geometric center of the shape defined by the support base; and
   d) providing a force receiving location on the bicycle support member to receive a force from a bicycle when the bicycle is mounted to the workstand.

16. The method of supporting a bicycle as described in claim 15 and further comprising the step of utilizing three points of support to establish a three point support on a support surface.

17. A method of providing a workstand support for a bicycle, the workstand having an open position that establishes a centroid of the workstand when in the open position and while not supporting a load from a bicycle, the method comprising the steps of:
   a) providing a support base to support a workstand on a support surface;
   b) providing a bicycle support member;
   c) coupling the bicycle support member to the support base at a coupling point on the support base; and
   d) providing a force receiving location on the bicycle support member to receive a force from a bicycle when the bicycle is mounted to the workstand;
wherein the coupling point on the support base is located off-center from the centroid.

18. The method of providing a workstand support for a bicycle as described in claim 15 wherein the workstand comprises a front side to access a bicycle attached to the workstand and a rear side opposite from the front side, and further comprising the step of establishing the force receiving location toward the rear side relative to the geometric center.

19. The method of providing a workstand support for a bicycle as described in claim 15 and further comprising the step of establishing the force receiving location on the bicycle support member on-center with the geometric center of the shape defined by the points of support of the support base.

20. The method of providing a workstand support for a bicycle as described in claim 15 wherein the workstand comprises a front side to access a bicycle attached to the workstand and a rear side opposite from the front side, and further comprising the step of establishing the force receiving location on the bicycle support member toward the rear side relative to the centroid.

21. The method of providing a workstand support for a bicycle as described in claim 20 wherein the workstand has a loaded centroid when the workstand is configured in an open position and supporting the weight of a bicycle and further comprising the step of establishing the force receiving location of the bicycle support member the toward the rear side relative to the centroid.

22. The method of providing a workstand support for a bicycle as described in claim 15 and further comprising the step of establishing the force receiving location of the bicycle support member above the centroid.

23. The method of supporting a bicycle as described in claims 15 or 17 and further comprising the step of telescoping the bicycle support member.

24. The method of supporting a bicycle as described in claims 15 or 17 wherein the support base comprises support legs and further comprising the step of configuring the support legs so as to provide an open workspace for the feet of a user in front of a bicycle mounted on the bicycle support member.

25. The method of supporting a bicycle as described in claims 15 or 17 wherein the support base comprises a first leg, a second leg, and a third leg, and further comprising the step of utilizing a length of the third leg that is shorter relative to the length of the first and second legs.

26. The method of supporting a bicycle as described in claim 25 and further comprising the step of providing an open workspace for the feet of a user in front of a bicycle mounted on the bicycle support member.

27. The method of supporting a bicycle as described in claims 15 or 17 and further comprising the step of rotating at least one leg of the workstand.

28. The method of supporting a bicycle as described in claim 27 and further comprising the step of rotating at least one rotatable member into substantial parallel alignment with the bicycle support member.

29. A bicycle workstand comprising:
   a) a first member;
   b) a second member coupled to said first member; and
   c) a three point support established by the first member coupled to the second member;

d) a first point of support of said three point support established by said first member;

e) a second point of support of said three point support established by said second member; and f) a third point of support of said three point support established by said first member.

30. A bicycle workstand comprising:

a) a first member;

b) a second member coupled to said first member; and c) a three point support established by the first member coupled to the second member;

d) a first point of support of said three point support established by said first member; and e) a second point of support of said three point support established by said second member;

wherein said first member and said second member are coupled so as to create a third point of support, said third point of support comprising a support surface on said first member in juxtaposition with a support surface on said second member.

31. The bicycle workstand as described in claims 29 or 30 and further comprising a bicycle support member.

32. The bicycle workstand as described in claim 31 wherein the bicycle support member comprises a telescoping bicycle support member.

33. The bicycle workstand as described in claim 31 wherein the workstand can be erected on a support surface and wherein the bicycle support member is non-perpendicular relative to the support surface.

34. The bicycle workstand as described in claim 33 wherein the bicycle support member comprises a telescoping bicycle support member.

35. The bicycle workstand as described in claims 29 or 30 wherein the three points of support establish a triangle, the triangle having a geometric center, and further comprising a support base coupled to the three points of support and a bicycle support member coupled to the support base at a coupling point located off-center from the geometric center of the triangle.

36. The bicycle workstand as described in claims 29 or 30 wherein the first member is rotatable.

37. The bicycle workstand as described in claim 36 wherein the second member is rotatable.

38. The bicycle workstand as described in claim 37 wherein the first and second members can be established in a substantial parallel alignment with the bicycle support member.

39. The bicycle workstand as described in claims 29 or 30 and further comprising a housing coupled to at least one of the members.

40. The bicycle workstand as described in claim 39 and further comprising a socket wherein the first member is rotatable relative to the socket.

41. The bicycle workstand as described in claim 40 wherein the rotatable members can be established in an open position to support the bicycle workstand and a closed position and further comprising a releasable latch to latch the rotatable members in at least one position.

42. The bicycle workstand as described in claim 41 and further comprising alignment holes.

43. The bicycle workstand as described in claim 42 and further comprising a locking pin insertable through the alignment holes.

44. The bicycle workstand as described in claim 43 and further comprising a retainer to retain the locking pin to the workstand.

45. The bicycle workstand as described in claims 29 or 30 and further comprising a support base wherein the support base comprises a first leg of fixed length.

46. The bicycle workstand as described in claim 45 and further comprising a second leg of fixed length.

47. The bicycle workstand as described in claim 46 and further comprising a third leg wherein the third leg is shorter relative to the first and second legs.

48. A method of supporting a bicycle workstand comprising the steps of:

a) supporting the bicycle workstand with a first member;

b) supporting the bicycle workstand with a second member coupled to said first member;

c) supporting the bicycle workstand in a three-point support having three points of support, wherein the three points of support are provided by said first and second members.

49. The method of supporting a bicycle workstand as described in claim 48 and further comprising the step of coupling a bicycle support member to the three point support.

50. The method of supporting a bicycle workstand as described in claim 48 wherein the three points of support establish a triangle having a geometric center and further comprising the step of coupling a bicycle support member to the workstand at a coupling point located off-center from the geometric center of the triangle.

51. The method of supporting a bicycle workstand as described in claim 48 and further comprising the step of rotating the first member from an open position to a closed position.

52. The method of supporting a bicycle workstand as described in claim 51 and further comprising the step of rotating the second member from an open position to a closed position.

53. The method of supporting a bicycle workstand as described in claim 52 and further comprising the step of establishing the first, second and bicycle support members in a substantial parallel alignment.

54. The method of supporting a bicycle workstand as described in claim 48 wherein the workstand can be erected on a support surface and further comprising the step of establishing the bicycle support member in a non-perpendicular position relative to the support surface.

55. The method of supporting a bicycle workstand as described in claim 48 and further comprising the step of coupling the first and second members to a housing.

56. The method of supporting a bicycle workstand as described in claim 55 and further comprising the step of rotating the first member about a socket of the housing.

57. The method of supporting a bicycle workstand as described in claim 56 wherein the rotatable members comprise an open and a closed position and further comprising the step of latching the rotatable members in at least one position.

58. The method of supporting a bicycle workstand as described in claim 57 and further comprising the step of providing alignment holes to latch the rotatable members.

59. A bicycle workstand erectable on a support surface, the bicycle workstand comprising:

a) a housing;

b) a first member coupled to the housing;

c) a second member coupled to said housing, wherein said housing permits the first member and the second member to be rotated relative to each other; and d) a three point support comprising the first and second member;

wherein the housing is disposed in close proximity to the support surface when the workstand is erected on the support surface, wherein said first member has a first member rotation axis, wherein said second member has a second member rotation axis, and wherein said first member rotation axis and said second member rotation axis are parallel.

60. A bicycle workstand comprising:
   a) a housing;
   b) a rotatable first member coupled to the housing;
   c) a rotatable second member coupled to the housing, the second member rotatable relative to said rotatable first member; and
   d) a bicycle support member coupled to the housing and extending upward relative to a support surface to assist in coupling a bicycle to the workstand;
wherein the first and second members are rotatable from an open support position to a closed position and wherein the first, second and bicycle support members are substantially parallel aligned when oriented in the closed position, wherein said rotatable first member has a first member rotation axis, wherein said rotatable second member has a second member rotation axis, and wherein said first member rotation axis and said second member rotation axis are parallel.

61. The bicycle workstand as described in claim 59 and further comprising a bicycle support member.

62. The bicycle workstand as described in claim 61 wherein the three point support has a geometric center and wherein the bicycle support member is coupled to the housing at a coupling point located off-center from the geometric center of the three point support.

63. The bicycle workstand as described in claim 61 wherein the bicycle support member comprises a telescoping bicycle support member.

64. The bicycle workstand as described in claim 61 wherein the workstand can be erected on a support surface and wherein the bicycle support member is non-perpendicular relative to the support surface.

65. The bicycle workstand as described in claim 59 wherein the rotatable members have open positions and closed positions.

66. A bicycle workstand comprising:
   a) a housing;
   b) a first member coupled to the housing;
   c) a second member coupled to the housing, wherein said housing permits the first member and the second member to be rotated relative to each other; and
   d) a bicycle support member coupled to the housing, the bicycle support member extending upward relative to a support surface to assist in coupling a bicycle to the workstand when the bicycle support member is positioned in an open position;
wherein said first member has a first member rotation axis, wherein said second member has a second member rotation axis, and wherein said first member rotation axis and said second member rotation axis are parallel.

67. The bicycle workstand as described in claim 59, 60 or 66 and further comprising:
   a first leg of fixed length;
   a second leg of fixed length; and
   a third leg of fixed length,
wherein the third leg is of shorter length relative to the first and second legs.

68. The bicycle workstand as described in claims 59, 60, or 66 wherein the housing comprises a socket and wherein the first member is rotatable in the socket.

69. The bicycle workstand as described in claim 65, 60, or 66 and further comprising a latch to releasably latch the rotatable members in at least one position.

70. The bicycle workstand as described in claim 69 and further comprising alignment holes.

71. A method of supporting a bicycle comprising the steps of:
   a) coupling a first member to a housing;
   b) coupling a second member to the housing;
   c) coupling a bicycle support member to the housing;
   d) rotating the first and second members from an open position to a closed position; and
   e) aligning the first, second and bicycle support members in a substantial parallel alignment when in the closed position.

72. A method of supporting a bicycle comprising the steps of:
   a) coupling a first member to a housing;
   b) coupling a second member to the housing;
   c) coupling a bicycle support member to the housing;
   d) rotating the first and bicycle support members from an open position to a closed position; and
   e) aligning the first, second and bicycle support members in a substantial parallel alignment when in the closed position.

73. The method of supporting a bicycle as described in claims 71 or 72 and further comprising the step of establishing bicycle support member in a non-perpendicular position relative to a ground support surface.

74. The method of supporting a bicycle as described in claims 71 or 72 and further comprising the step of releasably latching the rotated members.

75. The method of supporting a bicycle as described in claims 71 or 72 and further comprising the step of utilizing three legs to support the bicycle on a support surface wherein the third leg comprises a length shorter than a length of the first or second leg.

76. The method of supporting a bicycle as described in claims 71 or 72 and further comprising the step of providing a three point support having three points of support adjacent a support surface, wherein the three points of support are provided by said first and second members.

77. The method of supporting a bicycle as described in claims 71 or 72 and further comprising the steps of
   a) utilizing a plurality of points of support to support the workstand on the support surface, the plurality of points of support defining a shape having a geometric center; and
   b) coupling the bicycle support member to housing at a coupling point located off-center from the geometric center of the shape defined by the plurality of points.

78. A bicycle workstand erectable on a support surface, the bicycle workstand comprising:
   a) a bicycle support member extending upward relative to the support surface when the workstand is erected on the support surface;
   b) a three point support coupled to the bicycle support member;
   c) a first leg of the three point support having a fixed length;
   d) a second leg of the three point support having a fixed length equivalent to the first leg;
   e) a third leg of the three point support having a fixed length shorter than the first and second legs.

79. The bicycle workstand as described in claim 78 and further comprising a housing coupled to the workstand.

80. The bicycle workstand as described in claim 79 and further comprising a rotatable first member coupled to the housing.

81. The bicycle workstand as described in claim 80 and further comprising a rotatable second member coupled to the housing.

82. The bicycle workstand as described in claim 81 wherein the first and second member have an open position and a closed position and wherein the first and second members are oriented in a substantial parallel alignment in the closed position.

83. The bicycle workstand as described in claim 78 wherein the housing is disposed on the third leg.

84. The bicycle workstand as described in claim 78 wherein the bicycle support member is non-perpendicular relative to the support surface when the workstand is erected on the support surface.

85. The bicycle workstand as described in claim 78 and further comprising the step creating a three point support having three points of support wherein the three points of support are established by a first and second member.

86. The bicycle workstand as described in claim 78 wherein the three points of support define a shape having a geometric center, and wherein the bicycle support member is coupled at a coupling location located off-center from the geometric center.

87. A bicycle workstand comprising:
   a) a support base to support the workstand on a support surface, the support base having:
      a1) a first member;
      a2) a second member coupled to the first member,
      a3) a three point support established by the first member coupled to the second member;
      a4) a first point of support of said three point support established by the first member;
      a5) a second point of support of said three point support established by the second member; and
      a6) a third point of support of the three point support established by the first member;
   b) a shape defined by the first, second and third points of support of the support base;
   c) a geometric center of the shape defined by the first, second and third points of support;
   d) a housing coupled to the support base;
   e) a bicycle support member coupled to the housing at a coupling point located off-center relative to the geometric center of the shape defined by the first, second and third points of support of the support base;
   f) a force receiving location on the bicycle support member to receive a force from a bicycle load mounted to the workstand; and
   g) at least one rotatable leg member coupled to the housing, wherein the rotatable leg member extends outward from and above the housing relative to the support surface before bending toward the support surface to establish a point of support for the workstand.

88. The workstand as described in claim 87 and further comprising:
   a non-perpendicular bicycle support member extending from the housing to form an angle relative to a plane of the support surface of less than ninety degrees.

89. The workstand as described in claim 87 and further comprising:
   a first socket of the housing;
   a second socket of the housing;
   a first rotatable leg member coupled to the first socket of the housing;
   a second rotatable leg member coupled to the second socket of the housing;
   an axis of rotation of the first rotatable leg member;
   an axis of rotation of the second rotatable leg member;
   wherein the wherein the axis of rotation of the first rotatable leg member and the axis of rotation of the second rotatable leg member are in parallel.

90. The workstand as described in claim 89 and further comprising a third leg member, wherein the first rotatable leg member and the second rotatable leg member are of equivalent length and wherein the third leg member is substantially shorter than the length of the first and second rotatable leg members.

91. The workstand as described in claim 89 wherein the housing comprises a channel and wherein the first and second rotatable leg members are retained by the channel and wherein the channel permits rotation of the first and second rotatable leg members.

92. A method of providing a workstand support for a bicycle, the method comprising the steps of:
   a) providing a support base to support the workstand on a support surface, the support base comprising:
      a1) a first member;
      a2) a second member coupled to the first member;
      a3) a three point support established by the first member coupled to the second member;
      a4) a first point of support of said three point support established by the first member;
      a5) a second point of support of said three point support established by the second member; and
      a6) a third point of support of the three point support established by the first member;
   b) establishing a shape defined by the first, second and third points of support of the support base;
   c) establishing a geometric center of the shape defined by the first, second and third points of support of the support base;
   d) coupling a housing to the support base;
   e) coupling a bicycle support member to the housing at a coupling point located off-center relative to the geometric center of the shape defined by the first, second and third points of support of the support base;
   f) providing a force receiving location on the bicycle support member to receive a force from a bicycle load mounted to the workstand; and
   g) coupling at least one rotatable leg to the housing;
   h) extending the at least one rotatable leg member outward from and above the housing relative to the support surface;
   i) bending the at least one rotatable leg member toward the support surface to establish a point of support for the workstand.

93. The method of 92 and further comprising the step of extending the bicycle support member from the housing at an angle less than ninety degrees relative to the support surface.

94. The method of 92 and further comprising the steps of:
   providing a first socket of the housing;

providing a second socket of the housing;

providing a first rotatable leg member coupled to the first socket of the housing;

providing a second rotatable leg member coupled to the second socket of the housing;

rotating the first rotatable leg member about an axis of rotation of the first rotatable leg member; and rotating the second rotatable leg member about an axis of rotation of the second rotatable leg member;

wherein the axis of the first rotatable leg member and the axis of the second rotatable leg member are parallel.

95. The method of 94 wherein the first rotatable leg member and the second rotatable leg member are of equivalent length and further comprising the steps of:

provi ding a third leg member having a length substantially shorter than the first and second rotatable leg member.

96. The method of 95 and further comprising the steps of:

providing a channel on the housing;

retaining the rotatable leg member in the housing via the channel; and permitting rotation of the rotatable leg member via the channel.

* * * * *